(12) United States Patent
Singvall et al.

(10) Patent No.: US 7,542,443 B2
(45) Date of Patent: Jun. 2, 2009

(54) RECEIVE WINDOW UPDATES IN COMMUNICATION SYSTEMS

(75) Inventors: Jakob Singvall, Lund (SE); Johan Axnäs, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 451 days.

(21) Appl. No.: 11/215,585

(22) Filed: Aug. 30, 2005

(65) Prior Publication Data
US 2006/0182057 A1 Aug. 17, 2006

Related U.S. Application Data

(60) Provisional application No. 60/652,933, filed on Feb. 15, 2005.

(51) Int. Cl.
*H04W 4/00* (2006.01)
(52) U.S. Cl. ............... 370/328; 370/229; 714/751; 714/748; 709/232; 710/29
(58) Field of Classification Search ............... 370/328, 370/229; 714/751, 748; 709/232; 710/29
See application file for complete search history.

(56) References Cited

U.S. PATENT DOCUMENTS

| | | | |
|---|---|---|---|
| 7,284,179 B2 * | 10/2007 | Jiang | 714/748 |
| 2002/0097809 A1 | 7/2002 | Jiang | |

OTHER PUBLICATIONS

3GPP Technical Specification TS 44.060, V5.14.0, Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 5); Nov. 2004; pp. 1-10, 89-115.

3GPP Technical Specification TS 44.060, V6.10.0, Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6); Nov. 2004; pp. 1-12, 105-133.

3GPP Technical Specification TS 43.246, V6.2.0, Technical Specification Group GSM/EDGE Radio Access Network; Multimedia Broadcast Multicast Service (MBMS) in the GERAN; Stage 2 (Release 6); Jan. 2005.

PCT International Search Report, mailed Jun. 30, 2006, in connection with International Application No. PCT/EP2006/000905.

PCT Written Opinion, mailed Jun. 30, 2006, in connection with International Application No. PCT/EP2006/000905.

* cited by examiner

*Primary Examiner*—Lester Kincaid
*Assistant Examiner*—Charles Shedrick
(74) *Attorney, Agent, or Firm*—Potomac Patent Group PLLC (57) ABSTRACT

Keeping track of potential receive window positions in a communication system can prevent the receive window from moving from the proper potential positions, thereby reducing the probability of incorrect positions of the receive window. For example, a receive window can be updated by comparing the block number of a received block to a receive window; if the block number of the received block is outside the receive window, discarding the received block; if the block number of the received block is inside the receive window, retaining the received block; and determining an updated receive window that has a reduced size that excludes received blocks having block numbers that are not permitted according to the sequence of block numbers.

15 Claims, 6 Drawing Sheets

FIG. 1

| N0 | Receive Window | Header Decoding | N | Correct N (reference) |
|---|---|---|---|---|
| 10000 | 10000-12047 | Correct | 10000 | 10000 |
| 10001 | 10001-12048 | Incorrect (undetected error) | 10781 | 10001 |
| 10782 | 10782-12829 | Correct | 12050 | 10002 |
| 12051 | 12051-14098 | Correct | 12051 | 10003 |
| 12052 | 12052-14099 | Correct | 12052 | 10004 |

FIG. 2A

| N0 | Receive Window | Header Decoding | N | Correct N (reference) |
|---|---|---|---|---|
| 10000 | 9488-11535 | Correct | 10000 | 10000 |
| 10001 | 9489-11536 | Incorrect (undetected error) | 10781 | 10001 |
| 10782 | 10270-12317 | Correct | 12050 | 10002 |
| 12051 | 11539-13586 | Correct | 12051 | 10003 |
| 12052 | 11540-13587 | Correct | 12052 | 10004 |

FIG. 2B

| N0 | MaxN0 | Receive Window | Header Decoding | N | Correct N (reference) |
|---|---|---|---|---|---|
| 10000 | 10000 | 10000 | Correct | 10000 | 10000 |
| 10001 | 10001 | 10001 | Incorrect (undetected error) | 10781* | 10001 |
| 10001 | 10002 | 10001-10002 | Correct | 10002 | 10002 |
| 10003 | 10003 | 10003 | Correct | 10003 | 10003 |
| 10004 | 10004 | 10004 | Correct | 10004 | 10004 |

* block discarded because Block Number N outside Receive Window.

FIG. 3A

| N0 | MaxN0 | Receive Window | Header Decoding | N | Updated N0 | Correct N (reference) |
|---|---|---|---|---|---|---|
| 10000 | 10000 | 9488-10000 | Correct | 10000 | 10001 | 10000 |
| 10001 | 10001 | 9489-10001 | Incorrect (undetected error) | 10781* | 10001 | 10001 |
| 10001 | 10002 | 9489-10002 | Correct | 10002 | 10003 | 10002 |
| 10003 | 10003 | 9491-10003 | Correct | 10003 | 10004 | 10003 |
| 10004 | 10004 | 9492-10004 | Correct | 10004 | 10005 | 10004 |

* block discarded because Block Number N outside Receive Window.

RECEIVE WINDOW UPDATES IN COMMUNICATION SYSTEMS

This application claims the benefit of U.S. Provisional Patent Application No. 60/652,933 filed on Feb. 15, 2005, the contents of which is incorporated here by reference.

BACKGROUND

This invention relates to communication systems and devices and more particularly to systems and devices that keep track of potential receive window positions to prevent the receive window from moving from the proper potential positions, thereby reducing the probability of incorrect positions.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focusses on GSM/EDGE systems for economy of explanation, but it will be understood that the principles described in this application can be implemented in other digital communication systems.

Figure 1:
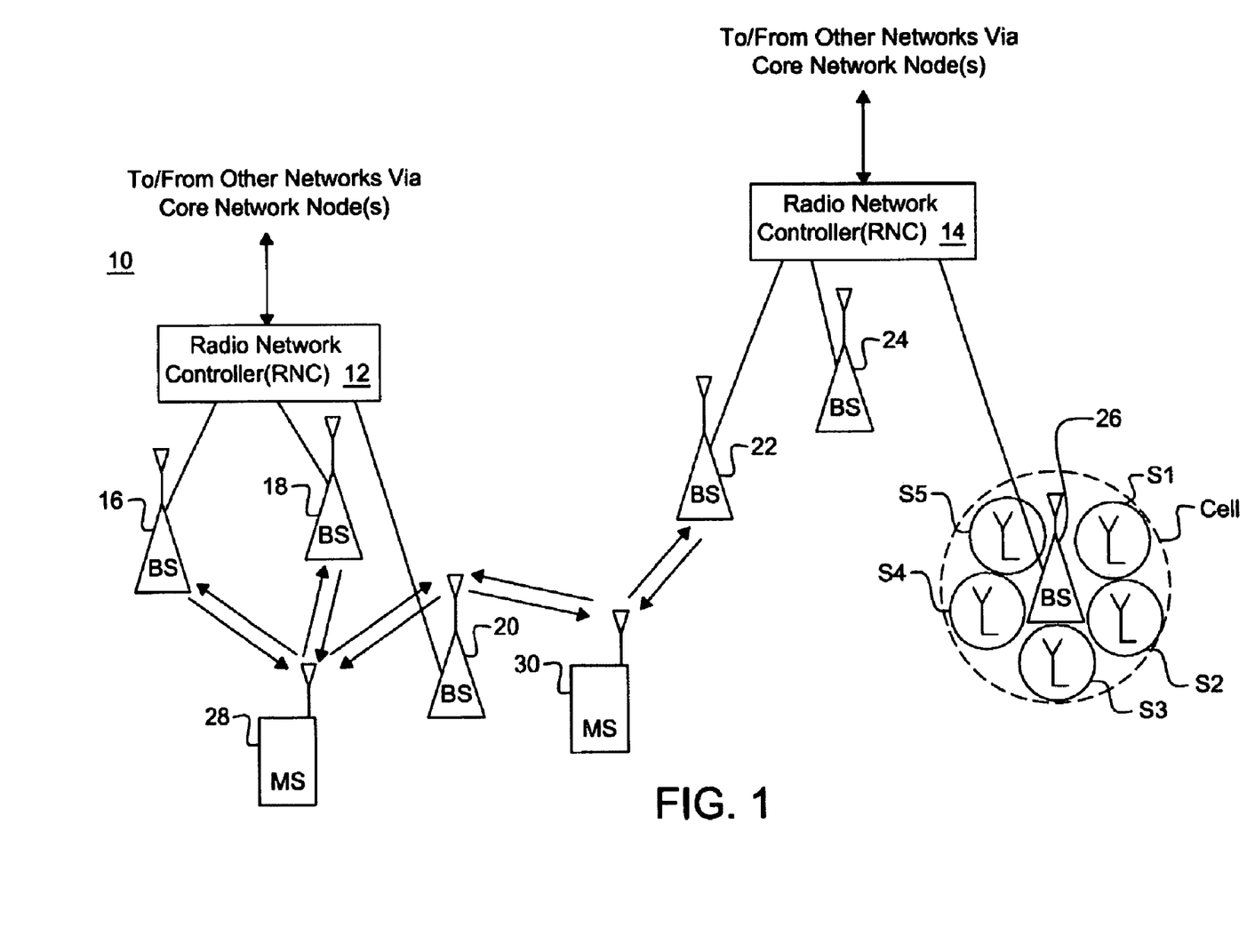
FIG. 1 depicts a telecommunication system.

FIG. 1 depicts a mobile radio cellular telecommunication system 10, which may be, for example, a GSM or a GSM/EDGE communication system. Radio network controllers (RNCs) 12, 14 control various radio network functions including for example radio access bearer setup, diversity handover, etc. More generally, each RNC directs calls to and from a mobile station (MS), or remote terminal or user equipment (UE), via the appropriate base station(s) (BSs), which communicate with each other through downlink (DL) (i.e., base-to-mobile or forward) and uplink (UL) (i.e., mobile-to-base or reverse) channels. RNC 12 is shown coupled to BSs 16, 18, 20, and RNC 14 is shown coupled to BSs 22, 24, 26. Each BS, which is a Node B in 3G vocabulary, serves a geographical area that can be divided into one or more cell(s). BS 26 is shown as having five antenna sectors S1-S5, which can be said to make up the cell of the BS 26. The BSs are typically coupled to their corresponding RNCs by dedicated telephone lines, optical fiber links, microwave links, etc. Both RNCs 12, 14 are connected with external networks such as the public switched telephone network (PSTN), the internet, etc. through one or more core network nodes like a mobile switching center (not shown) and/or a packet radio service node (not shown). In FIG. 1, MSs 28, 30 are shown communicating with plural base stations: MS 28 communicates with BSs 16, 18, 20, and MS 30 communicates with BSs 20, 22. A control link between RNCs 12, 14 permits diversity communications to/from MS 30 via BSs 20, 22.

A multimedia broadcast and multicast service (MBMS) for GSM and GSM/EDGE communication systems is being standardized by 3GPP. MBMS is described in 3GPP Technical Specification TS 43.246 ver. 6.2.0 Technical Specification Group GSM/EDGE Radio Access Network; Multimedia Broadcast Multicast Service (MBMS) in the GERAN; Stage 2 (Release 6) (January 2005), among other places.

MBMS offers high-speed and high-quality broadcast, or multicast, transmission to mobile stations (UEs). An important feature of MBMS will be to make the use of radio resources efficient by allowing point-to-multipoint (p-t-m) transmission over the air, which is to say that many terminals will be able to listen to the same transmission. This has motivated the introduction of a third radio link control (RLC) mode, the non-persistent mode, in addition to the other two RLC modes, unacknowledged mode and acknowledged mode. These three RLC modes are described in chapter 9 of 3GPP TS 44.060 General Packet Radio Service (GPRS); Mobile Station (MS)—Base Station System (BSS) interface; Radio Link Control/Medium Access Control (RLC/MAC) protocol (Release 6) V6.10.0, among other places.

The non-persistent transmission mode resembles the acknowledged and unacknowledged DL transmission modes of GSM/EDGE packet data (GPRS and enhanced GPRS (EG-PRS)). In acknowledged mode, the network can at any time request the terminal to send an acknowledgement/negative acknowledgement (ACK/NACK) feedback message indicating which Radio Link Control (RLC) blocks have or have not been correctly received so far, and all blocks must be re-transmitted until they have been reported as successfully received by the terminal. In unacknowledged mode, no ACK/NACK feedback is possible and only one transmission attempt is permitted for each RLC block; if a block is not correctly received after the first attempt, it is considered lost by the terminal.

In the non-persistent mode, RLC blocks may be lost, like GSM/EDGE unacknowledged mode, but also multiple transmissions of each RLC block are possible and the network may, if it wishes, poll the terminal for ACK/NACK feedback, like GSM/EDGE acknowledged mode. The freedom to poll or not to poll terminals, and to make re-transmissions even without polling, makes the non-persistent mode very useful for the p-t-m transmission of MBMS. Nevertheless, the non-persistent mode is not without problems.

Data to be transmitted in a communication system such as that depicted in FIG. 1 is split into RLC blocks for transmission over the air. Each RLC block has a header that contains, among other things, a block sequence number (BSN). The BSN in each RLC block is encoded with eleven bits, which is to say that 2048 different BSN values can be encoded. Many kinds of data, particularly MBMS data, require RLC blocks that number more than 2048. In order to handle block numbers outside the range 0-2047, the block number N is encoded as before modulo-2048. In order to make a block number N unambiguously derivable from a block sequence number BSN, different rules for the three RLC transmission modes are standardized.

Each RLC block header also includes a cyclic redundancy check (CRC) value, which in both GPRS and EGPRS systems is short, only eight bits. An 8-bit CRC value means that a header error has a probability of 1/256 of not being detected, assuming evenly distributed bit errors in the decoded block. An RLC block with an undetected header error is likely to have an incorrect BSN, which may cause a false (and often large) increase of N0 in non-persistent RLC mode, as well as in unacknowledged RLC mode. N0 is a number that is simply one more than the largest block number N yet received and that is used in determining the position and size of a "receive window" for deriving block numbers from block sequence numbers. This can lead to misinterpretation of the block numbers of many subsequent (correctly received) blocks.

SUMMARY

This application recognizes that it is possible to keep track of potential GPRS and EGPRS receive window positions and prevent the receive window from moving from the potential positions, thereby reducing the probability of incorrect positions of the receive window and solving the problem in the conventional unacknowledged and non-persistent RLC modes.

In one aspect of this invention, there is provided a method of updating a receive window in a receiver in a communication system in which radio link control blocks are transmitted according to at least one of an unacknowledged transmission mode and a non-persistent transmission mode, wherein each block has a respective block number and an encoded header that enables the block number to be determined, and the block numbers of blocks transmitted to the receiver have a sequence that is known to the receiver. The method includes the steps of comparing the block number of a received block to a receive window; if the block number of the received block is outside the receive window, discarding the received block; if the block number of the received block is inside the receive window, retaining the received block; and determining an updated receive window, wherein the updated receive window has a reduced size that excludes received blocks having block numbers that are not permitted according to the sequence.

In another aspect of this invention, there is provided a computer-readable medium containing a computer program for updating a receive window in a receiver in a communication system in which radio link control blocks are transmitted according to at least one of an unacknowledged transmission mode and a non-persistent transmission mode, wherein each block has a respective block number and an encoded header that enables the block number to be determined, and the block numbers of blocks transmitted to the receiver have a sequence that is known to the receiver. The computer program causes a processor to carry out the steps of comparing the block number of a received block to a receive window; if the block number of the received block is outside the receive window, discarding the received block; if the block number of the received block is inside the receive window, retaining the received block; and determining an updated receive window, wherein the updated receive window has a reduced size that excludes received blocks having block numbers that are not permitted according to the sequence.

In yet another aspect of this invention, there is provided a receiver for a communication system in which radio link control blocks are transmitted according to at least one of an unacknowledged transmission mode and a non-persistent transmission mode, wherein each block has a respective block number and an encoded header that enables the block number to be determined, and the block numbers of blocks transmitted to the receiver have a sequence that is known to the receiver. The receiver includes a front end configured to generate samples of received signals; and a processor configured to process the samples. The processor updates a receive window for the blocks by the steps of comparing the block number of a received block to a receive window; if the block number of the received block is outside the receive window, discarding the received block; if the block number of the received block is inside the receive window, retaining the received block; and determining an updated receive window, wherein the updated receive window has a reduced size that excludes received blocks having block numbers that are not permitted according to the sequence.

BRIEF DESCRIPTION OF THE DRAWINGS

The several objects, features, and advantages of Applicant's invention will be understood by reading this description in conjunction with the drawings, in which.

DETAILED DESCRIPTION

As noted above, different rules for the three RLC transmission modes are standardized in order to make a block number N unambiguously derivable from a block sequence number BSN. It will be understood that block numbers of blocks transmitted to a receiver are in a sequence that is known to the receiver.

For unacknowledged mode, a BSN is always interpreted as a value in the range N0 through N0+2047, where N0 is one more than the largest block number yet received. The range is typically called the "receive window".

For acknowledged mode, a BSN is always interpreted as a value in a different receive window, i.e., the range N0 through N0+WS-1, where N0 is the smallest block number N not yet acknowledged and WS is a settable window size parameter. In an EGPRS system, WS may be set by the network to a value in the range 64 to 1024. In a GPRS system, WS is always set to 64.

For non-persistent mode, a BSN is always interpreted as a value in the range N0-WS through N0+2047-WS, where N0 is the larger of (1) WS plus the smallest block number N not yet acknowledged and (2) one more than the largest block number N yet received. The receive window may thus be advanced either because a new largest block number is received or because an old block is acknowledged.

Re-transmissions of blocks having block numbers in the range N0-WS through N0-1 are possible. Blocks having BSNs outside this range should be discarded. Unacknowledged blocks having block numbers N less than N0-WS are lost.

In unacknowledged mode and non-persistent mode, N0 modulo 2048 equals a receive state variable V(R) described in 3GPP TS 44.060 V6.10.0, chapter 9. In acknowledged mode, N0 modulo 2048 equals a receive window state variable V(Q) described in 3GPP TS 44.060 V6.10.0, chapter 9.

Also as noted above, an RLC block with an undetected header error and thus an incorrect BSN can cause a false increase of N0 in unacknowledged and non-persistent RLC modes that can lead to misinterpretation of the block numbers of many subsequent (correctly received) blocks. It may be noted that this problem does not exist in acknowledged mode.

Figure 2A:
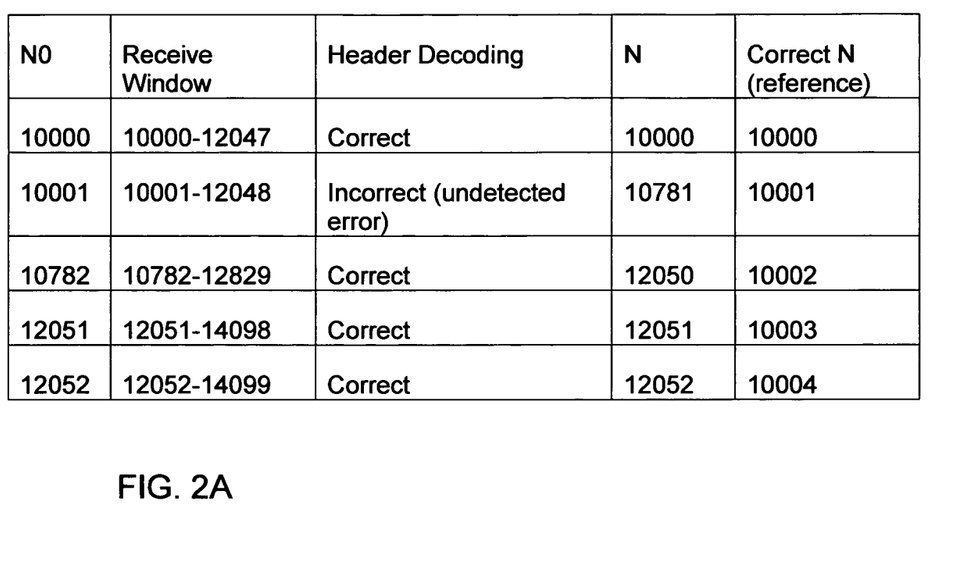
FIGS. 2A and 2B are tables that illustrate a problem due to an undetected RLC block header error.

FIG. 2A is a table that illustrates this problem for the unacknowledged RLC mode. As described in 3GPP TS 44.060 V6.10.0, chapter 9, RLC blocks are transmitted without retransmissions and the block numbers of the transmitted blocks are in a consecutive order sequence. Suppose a first received RLC block has block number N=10000 and its header is judged as correctly decoded based, for example, on its CRC. Then, according to the rule for unacknowledged mode, N0=10000 (i.e., one more than the largest block number yet received) and the receive window is 10000 through 12047. A second received RLC block has block number N=10001 (indicated in the right-most column) but its header is incorrectly decoded such that, for example, its block number N=10781 (indicated in the column next to the right-most column), and the error is undetected. Even so, N0=10001 according to the rule, and the receive window is 10001 through 12048.

A third received RLC block has block number N=10003 (indicated in the right-most column) and its header is judged as correctly decoded, but N0 has been falsely increased by the incorrect decoding of the second block's header such that N0=10782 and the receive window is falsely positioned at 10782 through 12829. Thus, the BSN of the third block will incorrectly be interpreted as a number somewhere in the false receive window, 10782 through 10782+2047. As shown for example in FIG. 2A, the number of the third block is interpreted as 10002+2048, or 12050.

This causes a further false increase of N0 for the fourth block to 12051, as shown in FIG. 2A, and the BSN of the fourth judged-as-correctly-decoded block header will incorrectly be interpreted as a number somewhere in the range 12051 through 14098. As shown for example in FIG. 2A, the number of the fourth block is interpreted as 12051, and the error continues to propagate. The fifth block has a block number N=10004, but is incorrectly interpreted as having a block number of 12052, and the error continues propagating through subsequent received blocks.

Thus, after a single error event, a possibly long series of subsequent block numbers is incorrectly interpreted. This may cause total shut down of the temporary block flow (TBF), which is the physical connection used by two radio resource (RR) entities to support the unidirectional transfer of upper-layer packet data units (PDUs) on packet data physical channels in the communication system. Even if the connection is not lost, there can be a long interruption in the transmission because of the single undetected header error.

Figure 2B:
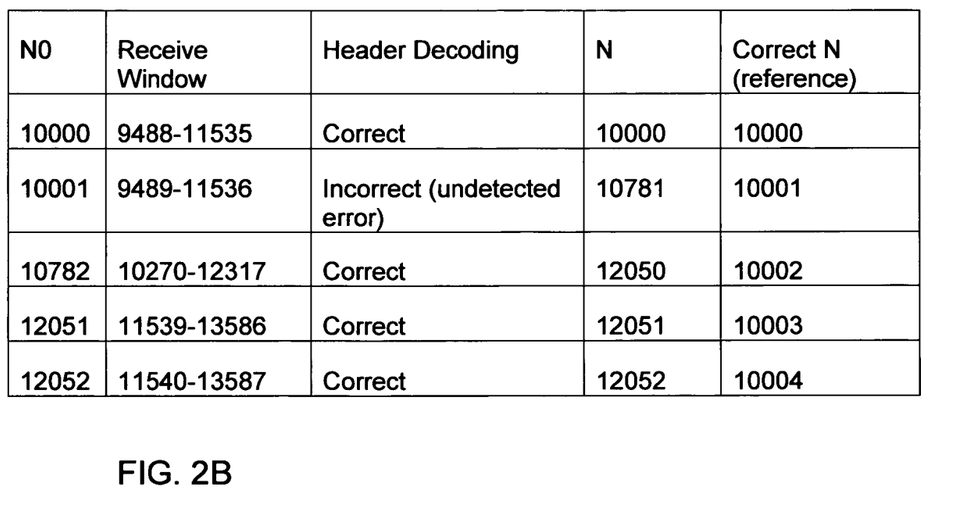

The same problem can occur in the non-persistent RLC mode, although the risk is slightly smaller because part of the BSN range 0-2047 (up to half of it, depending on setting of the WS parameter) is interpreted as invalid BSNs and leads to immediate discarding of the block. FIG. 2B shows an example for non-persistent mode with WS=512 and otherwise the same conditions as in the example 1 for unacknowledged mode (FIG. 2A). Comparing FIGS. 2A and 2B, it can be seen that only the receive windows are different due to the different rules for unacknowledged and non-persistent RLC modes.

As explained in more detail below, tracking receive window positions that are permitted based on already received blocks and preventing the receive window from moving from the permitted positions reduces the probability of incorrect positions of the receive window and solves the above-described problem in the conventional unacknowledged and non-persistent RLC modes. The following examples are given for GPRS and EGPRS communication systems, but it will be understood that this invention is not limited to communication systems according to the GPRS and EGPRS protocols.

In tracking permitted receive window positions, it is sufficient to keep track of only the largest permitted new position of the receive window, i.e., the permitted upper limit of the receive window, which is a parameter that can be called MaxN0. Then, the updating of N0 can be limited to realistic values, e.g., values less than or equal to the largest value in the largest permitted new receive window position, in unacknowledged and non-persistent RLC modes.

Thus, in unacknowledged RLC mode, RLC blocks are not discarded only when N is in the range N0 through MaxN0, which can be viewed as a reduction of the size of the receive window to a size based on previous block numbers, i.e., a size determined by the lower limit N0 and the upper limit MaxN0. The parameter MaxN0 is the upper limit of the receive window and the maximum possible value of N0 given that the network, as stipulated in applicable standard, uses all block numbers and transmits them to a receiver in a sequence of increasing order. This is the case for 3GPP TS 44.060 V6.10.0, as well as other communication system standards.

Figure 3A:
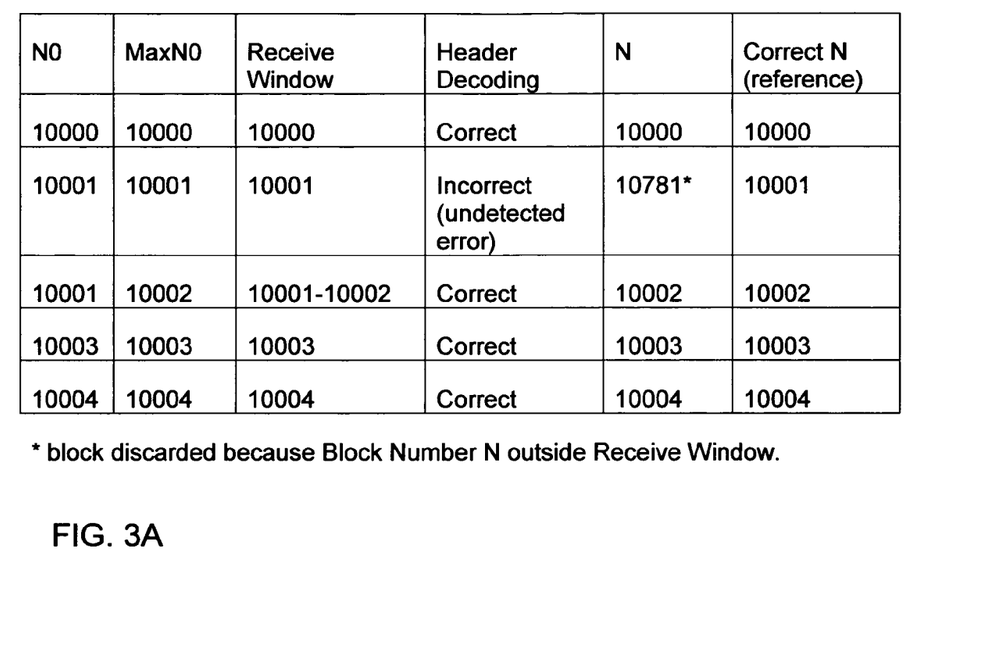
FIGS. 3A and 3B are tables that illustrate operation of the invention.

Operation of the invention in unacknowledged mode is indicated in FIG. 3A, which is a table for the same conditions as in the example described above in connection with FIG. 2A. Included in FIG. 3A is a column that indicates the MaxN0 values for the blocks shown. Comparing FIG. 2A and FIG. 3A, it can be seen that in FIG. 3A, only block N=10001 is lost.

In FIG. 3A, it can be seen that the upper limit MaxN0 equals the lower limit N0 as long as a header is judged as having been decoded correctly, and is incremented by a predetermined amount (in the example by +1) for each received block in case of a header decoding error that is detected through the CRC or when the block number N is outside the receive window. In the example shown, the upper limit parameter MaxN0 is incremented by +1, but MaxN0 may be incremented by other amounts, according to the particular communication system. In addition, the size of the receive window is effectively reduced according to the upper limit MaxN0, except in the event of an undetected error.

If a header decoding is incorrect and is undetected with the CRC, the incorrect block number (10781 in the example of FIG. 3A) is readily detected by comparison with the reduced-size receive window, and the block having the incorrectly decoded header is thus discarded or equivalently ignored. In order to keep track of the RLC blocks, the position of the receive window is still updated by incrementing the upper limit MaxN0. As soon as a header is judged as having been correctly decoded, MaxN0 is set to the value of N0.

It will thus be understood that decoding errors that are undetectable from the CRC can be detected in this way, and the parameter MaxN0 can be viewed as a complement to the CRC, e.g., a way to obtain lower probability of error from a CRC of a given size.

Figure 3B:
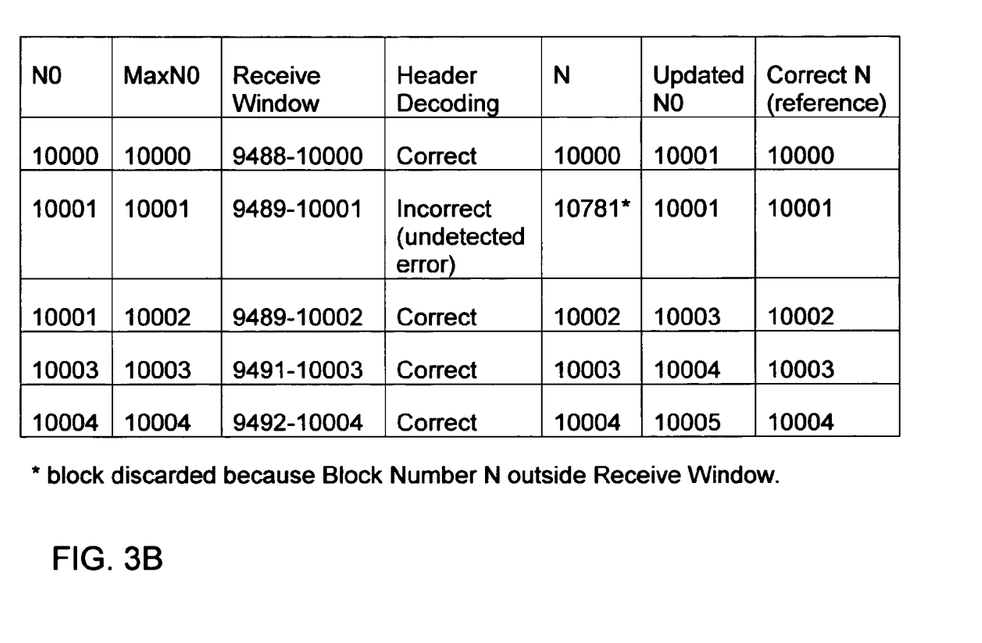

Operation of the invention in non-persistent mode is indicated in FIG. 3B, which is a table for the same conditions as in the example described above in connection with FIG. 2B. Included in FIG. 3B are a column that indicates the MaxN0 values for the blocks shown and a column that indicates updated N0 values as described below. Comparing FIG. 2B and FIG. 3B, it can be seen that in FIG. 3B, only block N=10001 is lost. In FIG. 3B, the value of MaxN0 is the same as the value of N0 for all blocks but the block having N=10002, which is the block received immediately after a block whose header is incorrectly decoded as 10781 due to an undetected error.

The operation in non-persistent mode is similar to operation in unacknowledged mode. In non-persistent mode, the RLC blocks are transmitted in a consecutive-order sequence with possibility of retransmissions according to 3GPP TS 44.060 V6.10.0, for example. Each new receive window is lower limit N0-WS through upper limit MaxN0, with MaxN0 defined as the maximum permitted value of N0, and in FIG. 3B as in FIG. 2B, WS=512. As in non-acknowledged mode, MaxN0 equals N0 as long as a header is judged as having been decoded correctly, and is incremented (in the example of FIG.

3B by +1) in case of a header decoding error that is detected through the CRC or when the block number N is outside the receive window.

The operation in non-persistent mode differs from that in unacknowledged mode in that MaxN0 is not set to the value of N0 as soon as a correct header is decoded. This can be seen by comparing the columns of N0, MaxN0, and updated N0 values. Instead, N0 is left unchanged, i.e., unincremented, because the corresponding received block might be a retransmission that was correctly decoded. If, however, N0 becomes larger than MaxN0, MaxN0 is immediately updated to equal N0. In this way, only block N=10001, the block whose header is incorrectly decoded, is lost.

The invention reduces the probability of incorrect updates of the receive window position, which can potentially cause interruptions in the transmissions. Besides that, incorrect updates of the receive window position degrade performance when using incremental redundancy (IR) in non-persistent mode. An incorrect update of the receive window may erase usable data in the IR memory and/or result in storage of incorrect data. This degradation of IR performance is reduced when using this invention.

These operations can be implemented by a suitably programmed processor, an application-specific integrated circuit, or other logic circuits in a mobile station or UE in a communication system such as that depicted in FIG. 1.

Figure 4:
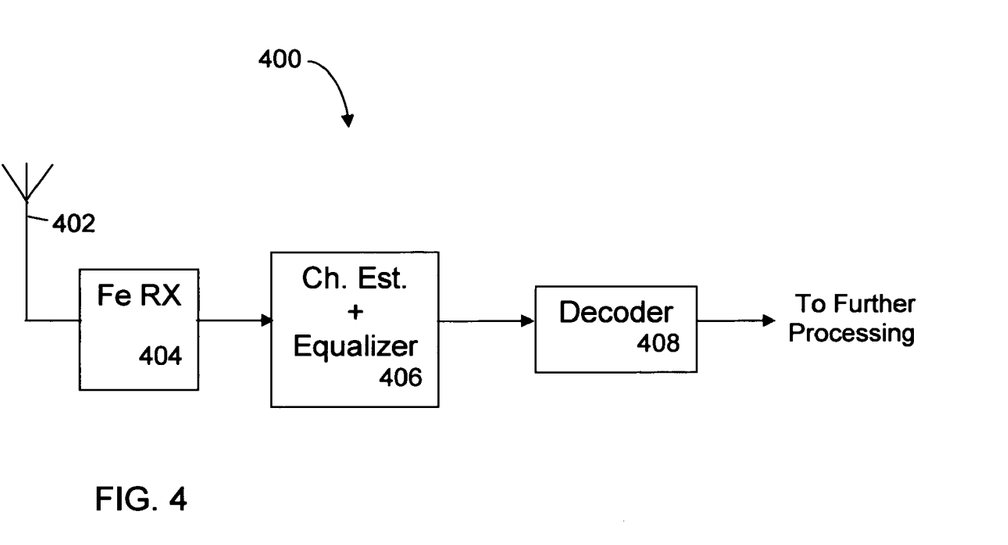
FIG. 4 is a block diagram of a receiver in a telecommunication system.

FIG. 4 is a block diagram of such a receiver 400 that receives radio signals through an antenna 402 and downconverts and samples the received signals in a front-end receiver (Fe RX) 404. The output samples are fed from Fe RX 404 to a channel estimator and equalizer 406 that estimates the impulse response of the radio channel and compensates for the effects of signal propagation through the changeable channel, for example by suitably handling received echoes of the received signal. An output of the estimator/equalizer 406 is provided to a symbol decoder 408 that produces information, e.g., digital data, that is further processed as appropriate for the particular communication system. Methods and apparatus for equalization, channel estimation, and symbol decoding are well known in the art. The decoder 408 is advantageously a programmed processor that implements the operations described above and either or both of the methods illustrated by FIGS. 5 and 6.

Figure 5:
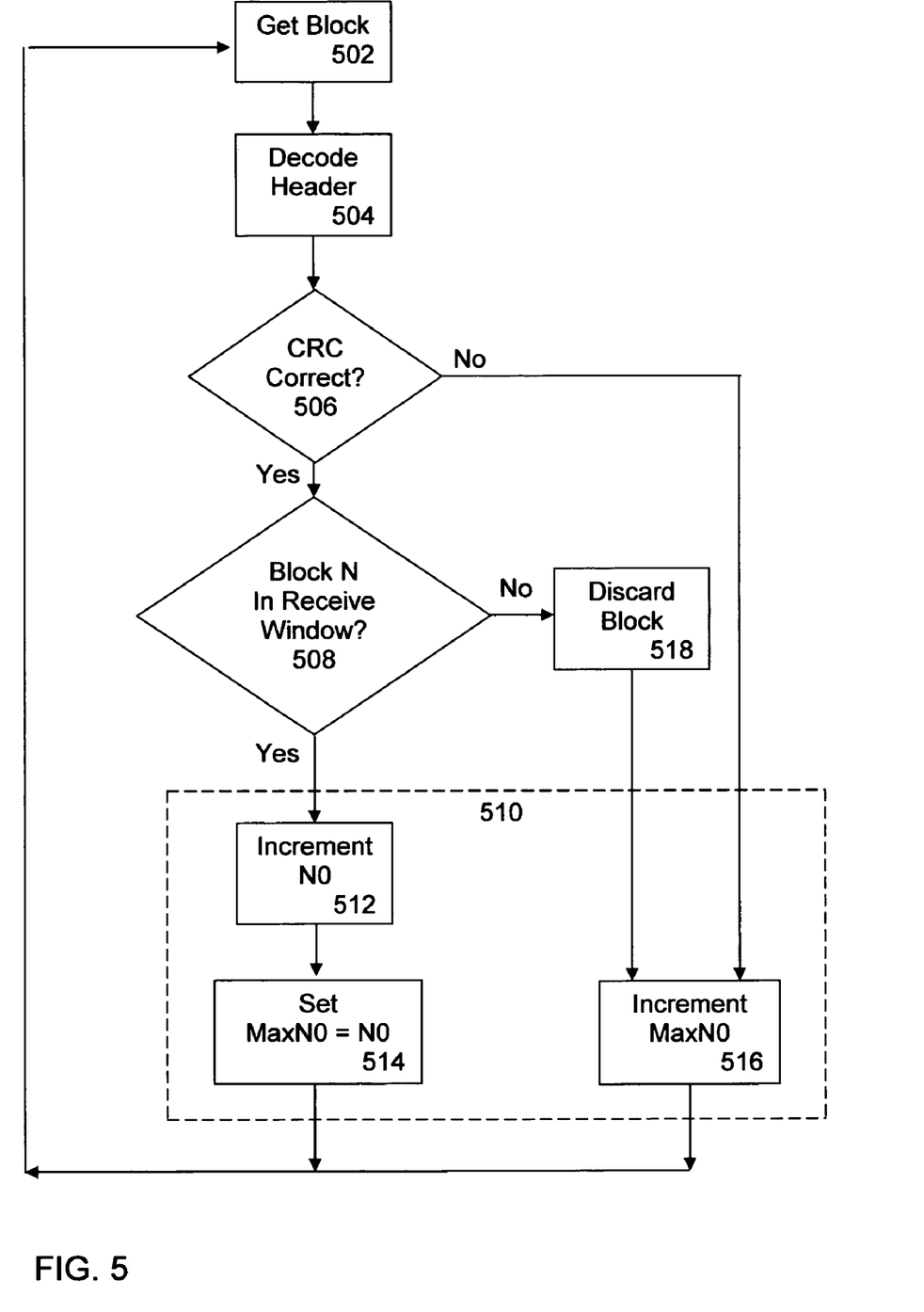
FIGS. 5 and 6 are flow charts of methods in accordance with aspects of the invention.

FIG. 5 is a flow chart of a method of updating the receive window in unacknowledged mode in accordance with an aspect of this invention. The method begins with getting an RLC block (step 502) and decoding the block header (step 504). If the block's CRC indicates correct decoding (Yes in step 506), whether the block number N is inside the receive window, i.e., equal to or between the lower and upper limits, is determined (step 508). If the block number is inside the receive window, a reduced-size receive window is determined (step 510) that excludes received blocks having (incorrectly) decoded block numbers that are not permitted according to the known sequence of block numbers.

As suggested by the dashed lines in FIG. 5, the step of determining a reduced-size window can include incrementing the window lower limit parameter N0 (step 512) and setting the window upper limit parameter MaxN0 equal to N0 (step 514), with the flow returning to step 502 for the next block. If the block's CRC indicates a decoding error that has been corrected (No in step 506), MaxN0 is incremented (step 516) and the flow returns to step 502 for the next block. If the block number N is outside the receive window (No in step 508), the block is discarded or otherwise ignored (step 518), MaxN0 is incremented (step 516), and the flow returns to step 502 for the next block.

Figure 6:
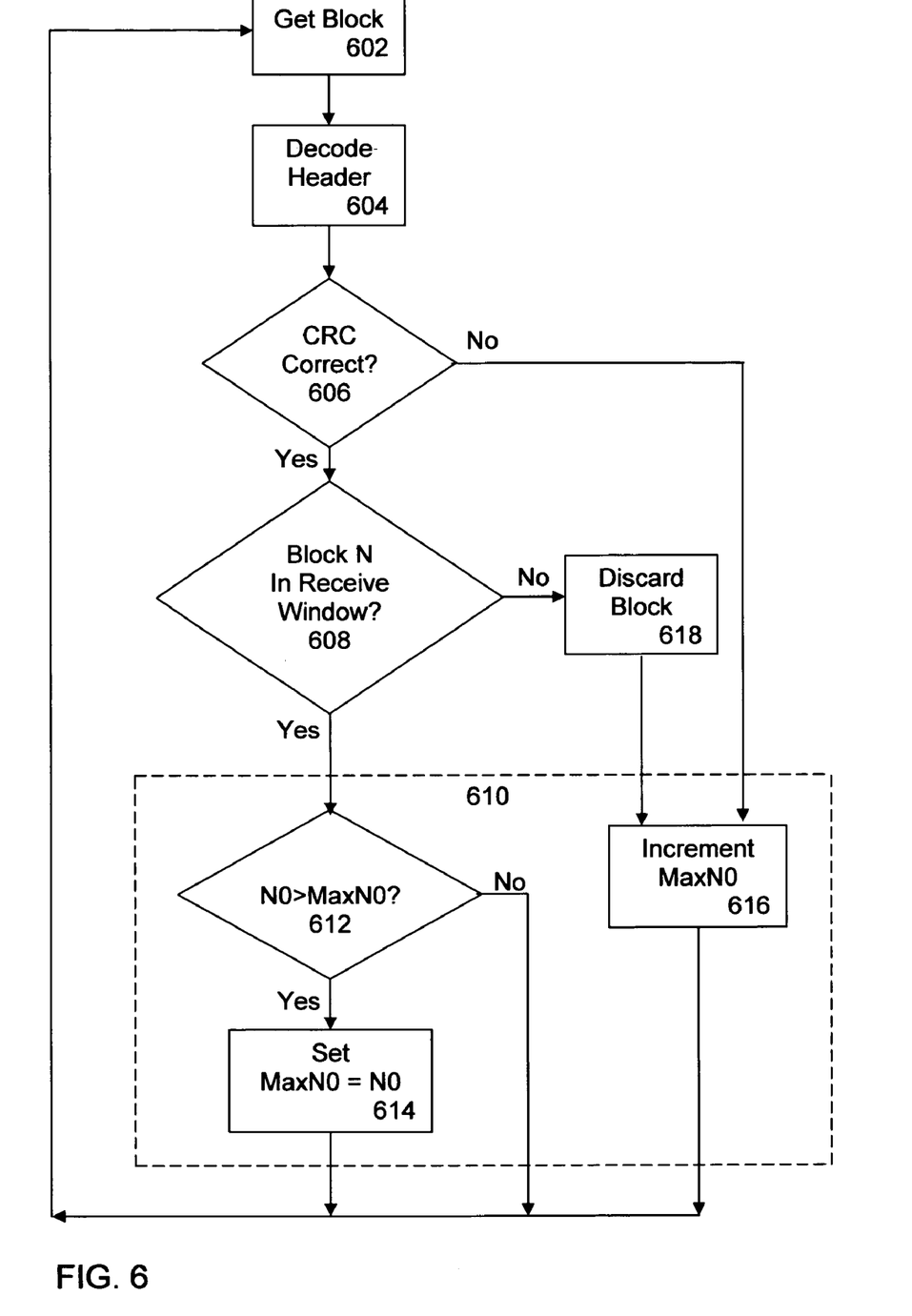

FIG. 6 is a flow chart of a method of updating the size of the receive window in non-persistent mode in accordance with another aspect of this invention. The method begins with getting an RLC block (step 602) and decoding the block header (step 604). If the block's CRC indicates correct decoding (Yes in step 606), whether the block number N is inside the receive window is determined (step 608). If the block number is inside the receive window (Yes in step 608), a reduced-size receive window is determined (step 610) that excludes received blocks having (incorrectly) decoded block numbers that are not permitted according to the known sequence of block numbers.

As suggested by the dashed lines in FIG. 6, the step of determining a reduced-size window can include determining whether N0 is greater than MaxN0 (step 612). If N0 is greater than MaxN0 (Yes in step 612), the window upper limit MaxN0 is set equal to N0 (step 614) and the flow returns to step 602 for the next block. If the block's CRC indicates a decoding error that has been corrected (No in step 606), MaxN0 is incremented (step 616) and the flow returns to step 602 for the next block. If the block number N is outside the receive window (No in step 608), the block is discarded or otherwise ignored (step 618), MaxN0 is incremented (step 616), and the flow returns to step 602 for the next block. If N0 is not greater than MaxN0 (No in step 612), the flow returns to step 602 for the next block.

It will be appreciated that procedures described above are carried out repetitively as necessary, for example, to respond to the time-varying nature of communication channels between transmitters and receivers. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, or store the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of updating a receive window in a receiver in a communication system in which radio link control blocks are transmitted according to at least one of an unacknowledged transmission mode and a non-persistent transmission mode, wherein each block has a respective block number and an encoded header that enables the block number to be determined, and the block numbers of blocks transmitted to the receiver have a sequence that is known to the receiver, the method executed by the receiver comprising the steps of: comparing the block number of a received block to a receive window; if the block number of the received block is outside the receive window, discarding the received block; if the block number of the received block is inside the receive window, retaining the received block; and determining an updated receive window, wherein the updated receive window has a reduced size that excludes received blocks having block numbers that are not permitted according to the sequence; wherein the determining step includes determining a MaxN0 parameter for the received block based on whether the block's header is judged to have been decoded correctly and whether the block number is inside the receive window; the size of the receive window is reduced based on the MaxN0 parameter; if the block's header is judged as correctly decoded and if the block number is inside the receive window, the MaxN0 parameter is set equal to an N0 parameter that is based on a the block number of a previously received block; and if the block's header is judged as incorrectly decoded or if the block number is outside the receive window, the MaxN0 parameter is determined by incrementing the MaxN0 parameter by a predetermined amount according to the sequence.

2. The method of claim 1, wherein the MaxN0 parameter is incremented by one.

3. The method of claim 1, wherein if the block's header is judged as correctly decoded and if the block number is inside the receive window, whether an N0 parameter that is based on a the block number of a previously received block is greater than the MaxN0 parameter is determined; if the N0 parameter is greater than the MaxN0 parameter, the MaxN0 parameter is set equal to an N0 parameter; and if the block's header is judged as incorrectly decoded or if the block number is outside the receive window, the MaxN0 parameter is determined by incrementing the MaxN0 parameter by a predetermined amount according to the sequence.

4. The method of claim 3, wherein the MaxN0 parameter is incremented by one.

5. The method of claim 1, wherein whether the block's header is judged to have been decoded correctly is based on cyclic redundancy information in the block.

6. A computer-readable medium containing a computer program for updating a receive window in a receiver in a communication system in which radio link control blocks are transmitted according to at least one of an unacknowledged transmission mode and a non-persistent transmission mode, wherein each block has a respective block number and an encoded header that enables the block number to be determined, and the block numbers of blocks transmitted to the receiver have a sequence that is known to the receiver, the computer program performs the steps of:
comparing the block number of a received block to a receive window;
if the block number of the received block is outside the receive window, discarding the received block;
if the block number of the received block is inside the receive window, retaining the received block; and
determining an updated receive window, wherein the updated receive window has a reduced size that excludes received blocks having block numbers that are not permitted according to the sequence;
wherein the computer program performs the determining step by determining a MaxN0 parameter for the received block based on whether the block's header is judged to have been decoded correctly and whether the block number is inside the receive Window; the size of the receive window is reduced based on the MaxN0 parameter; if the block's header is judged as correctly decoded and if the block number is inside the receive window, the MaxN0 parameter is set equal to an N0 parameter that is based on a the block number of a previously received block; and if the block's header is judged as incorrectly decoded or if the block number is outside the receive window, the MaxN0 parameter is determined by incrementing the MaxN0 parameter by a predetermined amount according to the sequence.

7. The computer readable medium of claim 6, wherein the MaxN0 parameter is incremented by one.

8. The computer readable medium of claim 6, wherein if the block's header is judged as correctly decoded and if the block number is inside the receive window, whether an N0 parameter that is based on a the block number of a previously received block is greater than the MaxN0 parameter is determined; if the N0 parameter is greater than the MaxN0 parameter, the MaxN0 parameter is set equal to an N0 parameter; and if the block's header is judged as incorrectly decoded or if the block number is outside the receive window, the MaxN0 parameter is determined by incrementing the MaxN0 parameter by a predetermined amount according to the sequence.

9. The computer readable medium of claim 8, wherein the MaxN0 parameter is incremented by one.

10. The computer readable medium of claim 6, wherein whether the block's header is judged to have been decoded correctly is based on cyclic redundancy information in the block.

11. A receiver for a communication system in which radio link control blocks are transmitted according to at least one of an unacknowledged transmission mode and a non-persistent transmission mode, wherein each block has a respective block number and an encoded header that enables the block number to be determined, and the block numbers of blocks transmitted to the receiver have a sequence that is known to the receiver, comprising:
a front end configured to generate samples of received signals; and
a processor configured to process the samples;
wherein the processor updates a receive window for the blocks by the steps of:
comparing the block number of a received block to a receive window;
if the block number of the received block is outside the receive window, discarding the received block;

if the block number of the received block is inside the receive window, retaining the received block; and determining an updated receive window, wherein the updated receive window has a reduced size that excludes received blocks having block numbers that are not permitted according to the sequence;

wherein the determining step includes determining a MaxN0 parameter for the received block based on whether the block's header is judged to have been decoded correctly and whether the block number is inside the receive window; the size of the receive window is reduced based on the MaxN0 parameter; if the block's header is judged as correctly decoded and if the block number is inside the receive window, the MaxN0 parameter is set equal to an N0 parameter that is based on a the block number of a previously received block; and if the block's header is judged as incorrectly decoded or if the block number is outside the receive window, the MaxN0 parameter is determined by incrementing the MaxN0 parameter by a predetermined amount according to the sequence.

12. The receiver of claim 11, wherein the MaxN0 parameter is incremented by one.

13. The receiver of claim 11, wherein if the block's header is judged as correctly decoded and if the block number is inside the receive window, whether an N0 parameter that is based on a block number of a previously received block is greater than the MaxN0 parameter is determined; if the N0 parameter is greater than the MaxN0 parameter, the MaxN0 parameter is set equal to an N0 parameter; and if the block's header is judged as incorrectly decoded or if the block number is outside the receive window, the MaxN0 parameter is determined by incrementing the MaxN0 parameter by a predetermined amount according to the sequence.

14. The receiver of claim 13, wherein the MaxN0 parameter is incremented by one.

15. The receiver of claim 11, wherein whether the block's header is judged to have been decoded correctly is based on cyclic redundancy information in the block.

* * * * *